United States Patent [19]

Wyslotsky

[11] 4,292,118

[45] Sep. 29, 1981

[54] IMPULSE HEAT GENERATION AND SEALER APPARATUS

[76] Inventor: Ihor Wyslotsky, 18630 Golfview La., Hazel Crest, Ill. 60429

[21] Appl. No.: 147,554

[22] Filed: May 8, 1980

[51] Int. Cl.³ .............................................. B30B 15/34
[52] U.S. Cl. .................................. 156/583.2; 53/373; 100/93 P; 156/498; 156/581; 493/209
[58] Field of Search .................. 156/583.2, 583.1, 515, 156/498, 581; 100/93 P; 53/373; 493/189, 209

[56] References Cited

U.S. PATENT DOCUMENTS

| | | | |
|---|---|---|---|
| 2,574,095 | 11/1951 | Langer | 156/583.2 |
| 2,621,704 | 12/1952 | Langer | 156/583.2 |
| 3,262,833 | 7/1966 | Zelnick | 156/583.2 |
| 3,660,210 | 5/1972 | Chapman | 156/583.1 |
| 3,692,613 | 9/1972 | Pederson | 156/583.2 |
| 3,927,297 | 12/1975 | Reil | 156/583.1 |
| 4,062,718 | 12/1977 | Hay | 156/498 |

*Primary Examiner*—Michael G. Wityshyn
*Attorney, Agent, or Firm*—Robert M. Ward

[57] ABSTRACT

The improved impulse heat generation and sealer apparatus of the present invention comprises preferably a metallic heat sink block bearing a shallow groove on the face surface thereof. The shallow groove is lined with a thin layer of an electrical insulator/heat conductor and the groove is filled with a preferably metallic electrically conductive material to form a smooth and preferably co-planar surface with the face surface of the metallic block. This smooth surface is coated with a thin layer of a release coating. A resilient mating surface is provided in preferred embodiments for reciprocating motion, whereby an electrical impulse rapidly generates heat in the groove filler material to bond together sheets of a polymeric material disposed between the mating surfaces, and the heat is rapidly dissipated to prevent damage to the sealed sheets. In other embodiments, the heat sink structure may be utilized in heat radiators or any other fast cycling heat exchanger.

32 Claims, 9 Drawing Figures

IMPULSE HEAT GENERATION AND SEALER APPARATUS

BACKGROUND OF THE INVENTION

The present invention is directed generally to electrical resistance heat generation devices and more particularly to an improved impulse heat generation and sealer apparatus for rapidly generating heat to form in some preferred embodiments a bond between sheets of a polymeric material and to rapidly dissipate the heat to prevent damage thereto.

In the prior art, various techniques have been utilized for bonding together two sheets of a polymeric sheet material such as may be done in closing the top of a plastic bag or in the formation of a container from two sheets of a polymeric material. One such device has been the impulse sealer.

Prior art impulse sealing devices have generally been constructed of an aluminum block which is water cooled and contains on the sealing surface thereof a flat wire which must be carefully formed and is generally fragile, difficult to make, expensive to construct, and lacks any substantial durability. Thermal expansion and contraction of such flat wire impulse sealers frequently results in undesirable creepage, inaccurate and inefficient sealing, and slow operation of cycles. In fact, such prior art flat wire impulse sealing devices have usually required as much as approximately two seconds to effect a seal as compared with approximately two hundred microseconds for conventional heat sealing.

In view of these and other difficulties associated with prior art impulse sealing devices, improvement is indicated and an object of the improved impulse generation and sealer apparatus of the present invention is to substantially reduce these difficulties.

SUMMARY OF THE PRESENT INVENTION

The improved impulse heat generation and sealer apparatus of the present invention includes a preferably metallic heat sink block having a substantially smooth face surface thereon, which has therein a shallow groove. An electrical insulator/heat conductor film lining is provided in and adhering to the shallow groove as a coating, and a preferably metallic filler material is disposed within the shallow groove over the lining to form a smooth and preferably co-planar surface. The groove filler material must have substantial electrical conductivity, thermal shock resistance, ability to expand and contract rapidly without damage and resistance to abrasion.

A thin layer of a release coating material is disposed over the outer surface. Electrical conductive means are connected to the groove filler material to provide electrical current thereto for the rapid generation of heat in the groove filler material.

Cooling means are preferably provided for the heat sink block for dissipating the heat therefrom to prevent damage to the formed heat seal and to the surrounding polymeric sheet material.

A mating block having a resilient outer surface and which has a mating and preferably planar contour is provided and is connected to reciprocating means for bringing the mating surfaces of the respective blocks together during sealing. An electrical impulse control means for providing a rapid pulse of electrical current to the electrical conductive means during the proximity of the mating surfaces is also provided. The result is one of rapid generation of heat in the groove filler material to bond together the sheets of polymeric material to form a seal and rapid dissipation of such heat immediately thereafter to prevent damage to the bond and to the surrounding areas of the sealed sheets.

The improved impulse heat generation and sealer apparatus of the present invention may be more completely understood with reference to the following drawing, detailed description of preferred embodiments, and appended claims.

BRIEF DESCRIPTION OF THE DRAWING

Preferred embodiments of the apparatus of the present invention and methods of forming the same, as summarized above and as set forth in greater detail hereinbelow, are illustrated in the following drawing, in which.

DETAILED DESCRIPTION OF PREFERRED EMBODIMENTS

Figure 1:
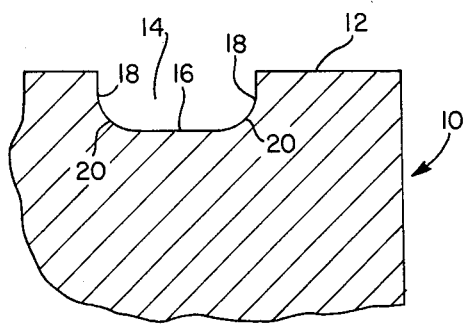
FIG. 1 is an enlarged transverse cross-sectional view of the electrically conductive heat sink block showing the shallow groove formed longitudinally on the face surface thereof.

The improved impulse heat generation and sealer apparatus of the present invention functions in some preferred embodiments to seal together two or more films of a polymeric sheet material, such as may be done in the closing of a plastic bag for containing a comestible or other product therewithin, or such as may be done in the formation of a sheet plastic container for a comestible product such as prepared meats, sliced meat, fruits and vegetables, etc. Other preferred embodiments of the apparatus of the present invention may be utilized for plug thermoforming of plastics, molds, and the surface heating of extrusion dies. Yet further, preferred embodiments may be utilized in heat radiators, heat sinks or for any other rapid cycling heat exchanger function.

The improved impulse heat generation and sealer apparatus of the present invention includes a preferably metallic heat sink block having thereon a smooth face surface. A shallow groove is formed in the face surface of the heat sink block. An electrical insulator and heat conductor film lining is provided within the shallow groove and a preferably metallic material of necessary conductive and physical properties such as substantial electrical conductivity, and abrasion and thermal shock resistance is disposed within the shallow groove to fill the groove. The groove filler material has an outer surface which is smooth and preferably co-planar with the smooth face surface of the heat sink block. A layer of substantially uniform thickness and having release coating characteristics is disposed on the smooth outer surface of the heat sink block and across the smooth outer surface of the groove filler material to form a substantially smooth and preferably co-planar outer surface. An electrical connector means is attached to the groove filler material to provide electrical current thereto for the rapid generation of heat in the groove filler material. Cooling means are associated with the heat sink block for removing heat therefrom and to prevent the substantial generation of heat within the heat sink block.

A second and mating block having thereon a resilient outer surface which is disposed in facing relationship to the smooth release coating layer is provided and has a mating contour. Reciprocating means for bringing the mating surfaces into substantial proximity are provided. An electrical impulse control means is included for applying a pulse of electricity to the electrical contact means during the proximity of the mating surfaces. The result is that heat is rapidly generated in the groove filler material to bond together the sheets of the polymeric material disposed therebetween and heat is rapidly dissipated immediately thereafter from the block and consequently from the bonded area to prevent damage thereto.

The impulse heat generation and sealer apparatus of the present invention may in preferred embodiments utilize a metal such as preferably aluminum as and for the heat sink block. The shallow groove may preferably be formed by photoetching or by machining techniques. The shallow groove is preferably rectangular in transverse cross-section and has a substantially greater width than depth in preferred embodiments. The rectangular shape for such shallow groove in such preferred embodiments has a bottom portion and two side portions extending therefrom at the respective groove bottom corners, and the groove bottom corners are preferably of a smooth and rounded shape in transverse cross-section.

The groove lining material may comprise alumina, anodized aluminum or synthetic sapphire in preferred embodiments and may preferably have a K value in the range of approximately 60 to approximately 90 units. The groove filler material preferably comprises a porous nickel-chromium alloy. Such groove filler and groove lining materials are preferably applied by plasma spraying for optimum thickness control, but may alternatively be applied by vapor deposition, painting, dipping and/or electroplating techniques. The preferred material for the release coating is TEFLON. Such release coating in preferred embodiments has a K value of greater than approximately 1000 units. The release coating may be applied by powder coating techniques which are well-known to those skilled in the art.

In certain preferred embodiments in the improved impulse heat generation and sealer apparatus of the present invention the groove filler material in plan view forms a closed loop whereby films of polymeric sheet material may be impulse sealed together to form a closed container. In such embodiments, the closed loop may be preferably in the form generally of a parallelogram which has substantially straight side portions connected by rounded corner portions for enhanced uniformity of flow of electrical current therearound and for enhanced uniformity of heating across the width of the rounded corners. In such preferred embodiments, the metallic groove filler may have a negative bank in thickness at the rounded corners; i.e., the rounded corners are greater in thickness at the inside radius thereof and lesser in thickness at the outside radius thereof to effect a greater uniformity of heating across the entire width of the rounded corners.

The mating surfaces may be preferably substantially planar, or alternatively may be in the form of any smooth mating curve in order to effect the desired smooth and uniform seal.

One preferred method of producing certain preferred embodiments of the improved impulse heat generation and sealer apparatus of the present invention includes providing a heat sink material preferably of a metal, such as aluminum or any other electrical conductor, in the form of a block having a substantial width and depth. A groove of a predetermined width and depth is cut, such as by machining for example, into a face surface of the block, the block having a smooth and preferably substantially planar face surface for receiving the groove. The groove receiving face surface of the block is then coated, preferably by plasma spraying with a film of a non-electrically conducting, but heat conducting coating, such as ceramic, alumina or synthetic sapphire. It is contemplated that the groove and entire groove receiving face surface may be coated, and then such groove lining material may be preferably removed from non-groove areas on such face surfaces.

Thereafter, a second material, which is electrically conductive is applied within the groove to substantially fill the groove therewith. Preferably, the groove filling operation is conducted by means of plasma spraying with a powdered metallic material to permit close control of the material deposited within the groove. The thickness of the layer deposited within the groove is also closely controlled, whereby the electrical resistance of the material's cross-section is determined.

Thereafter, the face of the heat sink block may be ground and polished to remove any excessive, upwardly projecting deposits of materials and to expose the controlled thickness of the groove filler electrical conductor. The face surface of the heat sink block is ground and polished so as to obtain a preferable planar surface. Finally, this preferred planar surface is coated with a release coating film, such as TEFLON, and preferably by means of spraying.

The metallic block is initially equipped with electrical connector means in the form of electrodes projecting into and communicating with the formed grooved areas, whereby electrical current may be provided to the groove filler material which has been deposited. As set forth hereinabove, although plasma spraying techniques are preferred, metallic vapor deposition, painting, dipping and electroplating techniques may be utilized for the formation of the coatings necessary in the above methods.

Referring now to the drawing, and to FIGS. 1-5 in particular wherein steps of a preferred method for producing the improved impulse heat generation and sealer apparatus of the present invention are schematicalIly set forth, a heat sink block generally 10 is provided with a face surface 12 thereof. A groove 14 is cut into such face surface 12 to a predetermined width and depth, and having a bottom surface 16 and side walls 18, 18 connected by groove bottom rounded corners 20, 20.

Figure 2:
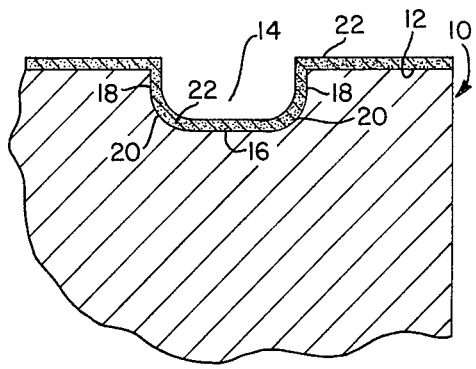
FIG. 2 is an enlarged transverse cross-sectional view of the electrically conductive heat sink block with shallow groove formed in the face surface thereof as shown in FIG. 1 and including groove lining material coating the shallow groove and also coating the outer surface of the heat sink block face surface.
Figure 3:
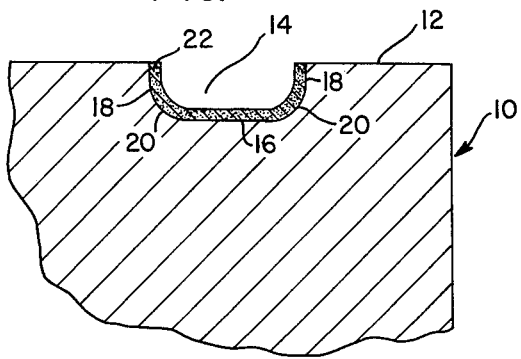
FIG. 3 is an enlarged transverse cross-sectional view of the heat sink block of FIGS. 1 and 2 showing the lined shallow groove with the groove lining material removed from all areas of the face surface of the block outside the groove.
Figure 4:
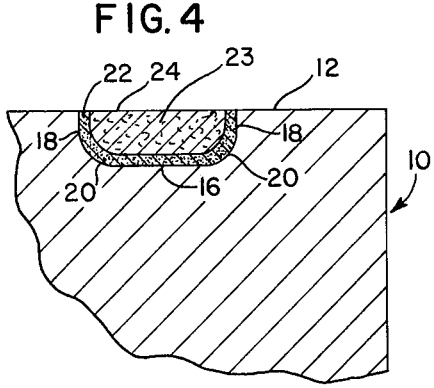
FIG. 4 is an enlarged transverse cross-sectional view of the electrically conductive heat sink block with groove lining material of FIG. 3, and further showing the lined groove filled with groove filler material, and having an outer surface which is co-planar with the face surface of the heat sink block.
Figure 5:
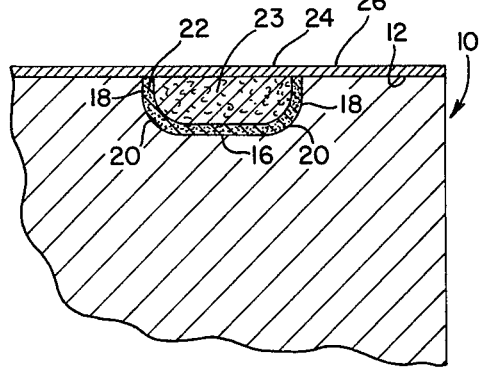
FIG. 5 is an enlarged transverse cross-sectional view of the lined and filled groove as shown in FIG. 4, and further including a thin layer of release coating material disposed across the face surface of the heat sink block including the co-planar surface of the groove filler material.

As shown in FIG. 2, heat sink block 10 is coated along its face surface 12 and the groove 14 with a groove lining 22. As shown in FIG. 3, the groove lining material 22 outside of groove 14 may preferably be removed from such face surface 12. With respect to FIG. 4, an electrically conductive groove filler material 23 is disposed within groove 14 to substantially fill the same to provide a smooth and preferably co-planar outer surface 24 of the groove filler material with face surface 12 of heat sink block 10. As a final step and as shown in FIG. 5, face surface 12 and co-planar surface 24 of heat sink block 10 are coated with a release coating layer 26.

Figure 6:
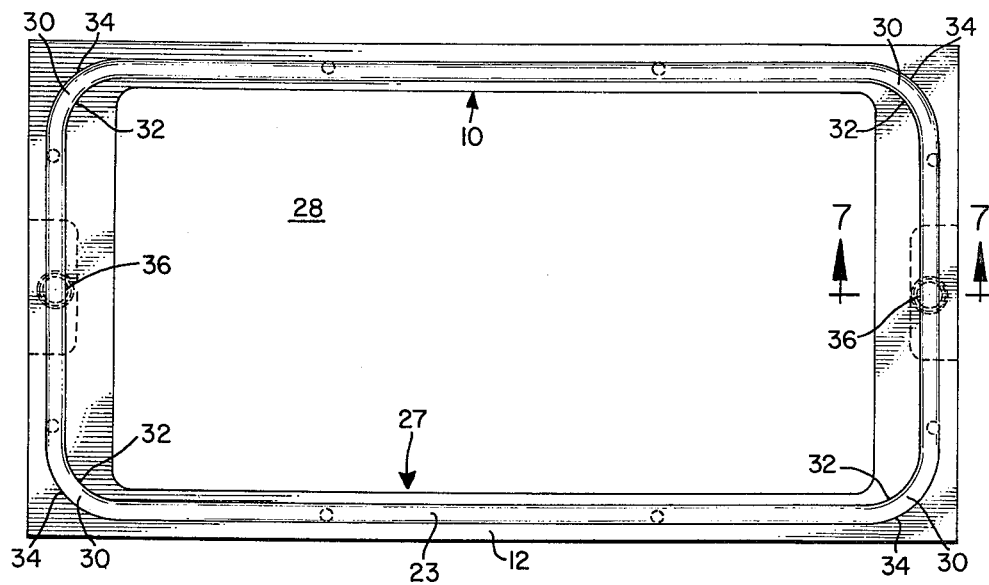
FIG. 6 is a plan view of the improved impulse heat generation and sealer apparatus of the present invention, showing the face surface of the electrically conductive heat sink block with a shallow groove formed therein, and depicting in phantom lines the location of the respective electrical connection means attached to the groove filler material to provide electrical current thereto for the rapid generation of heat in the groove filler material.

With reference to FIG. 6, wherein the improved impulse heat generation and sealer apparatus of the present invention generally 27 is shown, heat sink block 10 may preferably be of a generally rectangular shape and may have a substantial interior portion 28 thereof removed for lightness and to provide a frame-shaped configuration thereto. Groove filler material 23 shown in plan view has a generally rectangular shape in such plan view, but with preferably rounded corners 30 for smooth sealing of films of a thermoplastic material to form a container. Preferably, corners 30 of groove filler 23 have a negative bank and thickness, i.e., are greater in thickness at the inside radius 32 of corners 30 than at the outside radius 34 of such corners 30, whereby greater uniformity of heating across the width of rounded corners 30 is obtained. Electrical connector means 36 are shown in phantom lines in FIG. 6 and are set forth in greater detail hereinbelow with respect to the description of FIG. 7.

Figure 7:
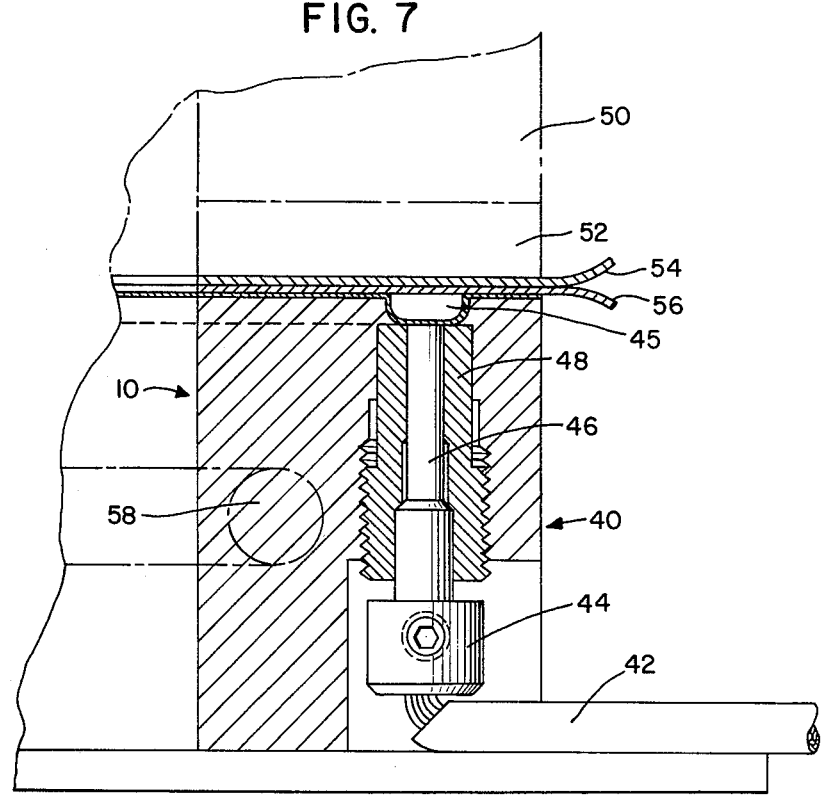
FIG. 7 is an enlarged transverse cross-sectional view taken along line 7—7 of FIG. 6 through the electrical connection means and showing the wire lead, the electrical contact, the insulator therefor, and the groove filler material which serves as the sealing element, all disposed within the electrically conductive heat sink block, and showing thereabove a mating block having a resilient outer surface disposed in facing relationship to the smooth release coating thin layer of the heat sink block, and depicting the sealing therebetween of two sheets of a thermoplastic material.

FIG. 7 is an enlarged transverse cross-sectional view taken along lines 7—7 of FIG. 6 through electrical connector means 36 in the form of electrode generally 40. An electrode 40 comprises a wire lead 42 which is connected to a source of electricity and feeds into an electrical contact 44, which is then connected through wire 46 to groove filler material 23, which thus forms the heat sealing element 45. An insulator 48 is provided about and surrounds wire 46 to insulate the same from the electrically conductive heat sink block 10.

Disposed opposite heat sink block 10 is a mating block 50 having a resilient facing surface 52 thereof and which is reciprocated into contact with heat sink block 10 for sealing an upper web 54 and a lower web 56 together as shown in FIG. 7 and the region proximate to the heat seal element 45. A water cooling channel 58 may be provided within heat sink block 10 for the cooling of the same.

The improved impulse heat generation and sealer apparatus of the present invention also may preferably include heat element insulation means and cycling cooling means. Such heat element insulation means preferably includes at least one insulating slot disposed in the heat sink block adjacent the filled shallow groove comprising the heat seal element for insulating the filled shallow groove from the remainder of the heat sink block thereby to reduce heat loss from the heat seal element during heating and sealing. At least one such insulating slot may preferably be disposed on each lateral side of the heat sealing element. Also, preferably the insulating slot extends into the heat sink block to a depth below that of the filled shallow groove comprising the heat seal element.

The cycling cooling means of the improved impulse heat generation and sealer apparatus of the present invention preferably includes a cycling chamber disposed in the heat sink block. At least a substantial portion of the cycling chamber is disposed beneath the heat seal element for alternating receipt therein of a coolant and a purging fluid, for the purpose of quickly cooling the filled shallow groove after heating and sealing, and for the purpose thereafter of purging the coolant in preparation for the next heating and sealing step. Pumping means are provided for alternatingly supplying the coolant and the purging fluid to the cycling chamber, whereby rapid heat cycling of the improved impulse heat generation and sealer apparatus of the present invention is attained. The coolant is preferably water, and the purging fluid is preferably air.

In preferred embodiments, the cooling cycling means also preferably includes a manifold disposed adjacent the heat sink block. Coolant inflow conduit means including outflow conduit means are connected to and supply the cycling chamber. Purging fluid inflow conduit means and outflow conduit means connect the cycling chamber and the manifold, thereby to alternatingly supply the coolant and purging fluid to the cycling chamber. In such preferred embodiments, the coolant inflow conduit means and the purging fluid inflow conduit means comprise common conduit means into the cycling chamber. Also, in such preferred embodiments, the purging fluid outflow conduit means and the coolant outflow conduit means comprise common conduit means from the cycling chamber and into the manifold. Preferably, the manifold is insulated from the heat sink block for maximum efficiency.

Figure 8:
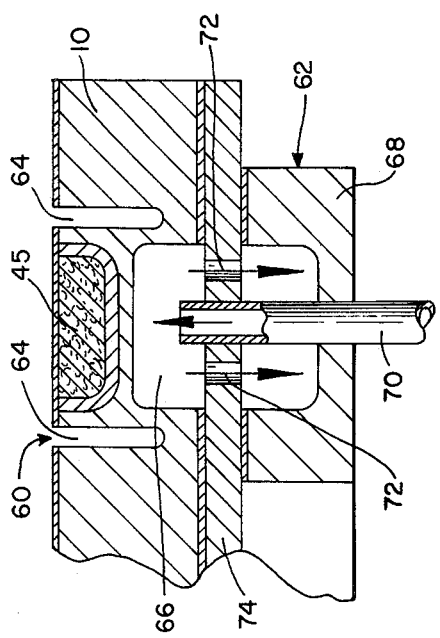
FIG. 8 is an enlarged transverse cross-sectional view showing a preferred embodiment having insulating slot means and cooling cycle means.

Referring now to FIG. 8, preferred heat element insulation means generally 60 and cycling cooling means generally 62 are depicted. Therein, the improved impulse heat generation and sealer apparatus of the present invention is shown with at least one insulating slot 64 disposed in heat sink block 10 adjacent filled shallow groove 14 comprising the heat seal element 45 for insulating filled shallow groove 14 from the remainder of heat sink block 10 for reducing heat loss from heat seal element 45 during heating and sealing. At least one such insulating slot 64 may preferably be disposed on each lateral side of heat seal element 45. Also preferably insulating slot 64 extends into heat sink block 10 to a depth below that of filled shallow groove 14 comprising heat seal element 45.

The improved impulse heat generation and sealer apparatus of the present invention also preferably includes a cycling chamber 66 disposed in heat sink block 10 with at least a substantial portion of cycling chamber 66 disposed beneath heat seal element 45 for alternating receipt therein of a coolant and a purging fluid for the purpose of quickly cooling heat seal element 45 after heating and sealing and for the purpose thereafter of purging the coolant in preparation for the next heating and sealing step. Pumping means (not shown) are provided for alternatingly supplying the coolant and the purging fluid to cycling chamber 66, whereby rapid heat cycling of the improved impulse heat generation and sealer apparatus of the present invention is attained. The coolant is preferably water and the purging fluid is preferably air. Arrows A, A illustrate these alternating flows into chamber 66.

In preferred embodiments, cooling cycling means 66 also preferably includes a manifold 68 disposed adjacent heat sink block 10. As shown, the coolant inflow conduit means and the purging fluid inflow conduit means comprise common inflow conduit means 70 into cycling chamber 66. Also, as shown, the purging fluid outflow conduit means and the coolant outflow conduit means comprise common outflow conduit means 72, 72 from cycling chamber 66 and into manifold 68. Preferably, manifold 68 is insulated from heat sink block 10 for maximum efficiency by insulating plate 74 containing apertures therein to accommodate common inflow conduit means 70 and common outflow conduit means 72.

Figure 9:
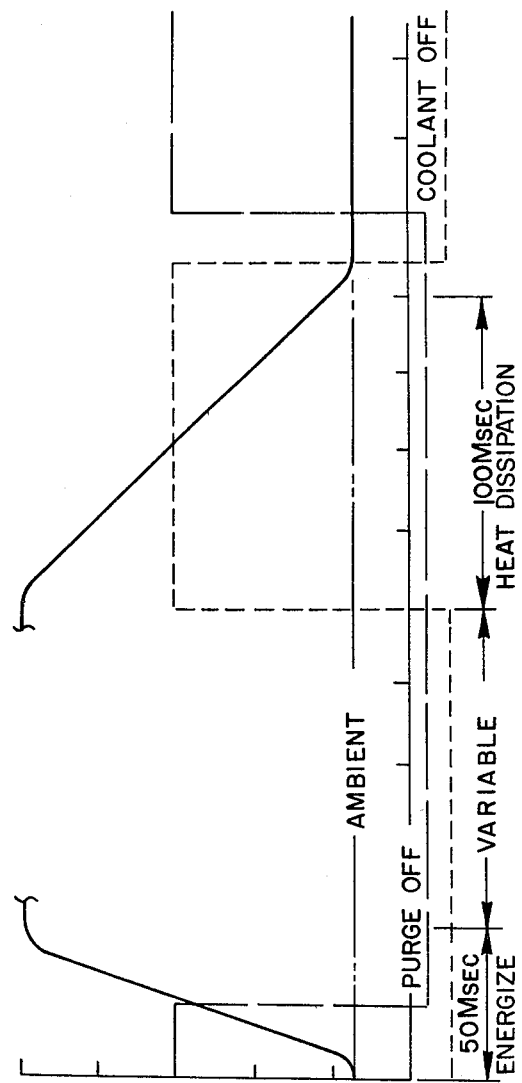
FIG. 9 is a graphical representation of seal element time versus temperature parameters and showing (in fragmented solid lines) the rapid increase and decrease of temperature from and to ambient temperatures, the application of coolant to the cycling chamber (in dotted lines), and the alternating application of purging fluid to the cycling chamber (in dashed lines).

With respect to FIG. 9 wherein a graphic representation of the heat seal element time versus the temperature parameters as shown, the heat sealing element 45 is raised from the ambient temperature to a temperature of at least approximately 500° F. within a period of approximately 50 milliseconds. Thereafter, mating block 50 and heat sink block 10 are maintained with their facing surfaces in contact with each other to effect the sealing of upper web 54 and lower web 56 for a variable time. Thereafter, heat is dissipated and the temperature is rapidly lowered from the sealing temperature of approximately 500° F. to the ambient temperature, within a period of 100 milliseconds.

Also with respect to FIG. 9, the dotted lines schematically represent the application of coolant to the cycling chamber after the heat seal element has reached its maximum, and sealing, temperature. As is shown, the temperature of heat seal element 45, and of course that of the seal being formed, decrease rapidly from approximately 500° F. to the ambient temperature under the quenching influence of the coolant disposed within the cycling chamber. When the heat seal element has reached the ambient temperature, the purging fluid is applied to the cycling chamber, and the supply of coolant is turned off. The presence of the purging fluid, which is preferably air, serves to insulate adjacent heat seal element 45 to prevent substantial loss of heat therefrom.

The basic and novel characteristics of the improved impulse heat generation and sealer apparatus of the present invention will be readily understood from the foregoing disclosure by those skilled in the art. It will become readily apparent that various changes and modifications may be made in the form, construction and arrangement of the improved impulse heat generation and sealer apparatus of the present invention as set forth hereinabove without departing from the spirit and scope of the invention. Accordingly, the preferred and alternative embodiments of the present invention set forth hereinabove are not intended to limit such spirit and scope in any way.

What is claimed is:

1. An improved impulse heat generation and sealer apparatus, said apparatus comprising:
   an electrically conductive heat sink block having thereon a smooth face surface;
   a relatively shallow groove formed in said face surface;
   an electrical insulator/heat conductor film lining of said shallow groove;
   a groove filler material of substantial electrical conductivity, substantial thermal shock resistance, substantial ability to expand and contract rapidly without damage, and substantial resistance to abrasion, said groove filler material disposed within and filling said shallow groove and having an outer surface which is smoothly co-extensive with said smooth face surface of said heat sink block;
   a thin layer of substantially uniform thickness of release coating material disposed on said smooth outer surface of said heat sink block and across said smoothly co-extensive outer surface of said groove filler material, said release coating layer having a substantially smooth outer surface; and
   electrical connector means attached to said groove filler material to provide electrical current thereto for the rapid generation of heat in said groove filler material.

2. The improved impulse heat generation and sealer apparatus of claim 1 further comprising:
   cooling means connected to said heat sink block for removing heat therefrom and to prevent the substantial generation of heat within said heat sink block.

3. The improved impulse heat generation and sealer apparatus of claim 1 further comprising:
   a mating block having thereon a resilient outer surface which resilient surface is disposed in facing relationship to said smooth release coating thin layer of said heat sink block and having a mating contour therefor;
   reciprocating means for bringing said mating surfaces into substantial proximity; and
   electrical impulse control means for applying a pulse of electricity to said electrical connector means during said proximity of said mating surfaces,
   whereby heat is rapidly generated in said groove filler material to bond together sheets of polymeric material disposed therebetween, and whereby the heat is rapidly dissipated to prevent damage to the sealed sheets.

4. The improved impulse heat generation and sealer apparatus of claim 3 wherein said mating surfaces extend to form a closed loop whereby sheets of polymeric material may be impulse sealed together to form a closed container.

5. The improved impulse heat generation and sealer apparatus of claim 4 wherein said closed loop is in the form generally of a parallelogram and has substantially straight side portions connected by rounded corner portions for enhanced uniformity of flow of electrical current therearound and for enhanced uniformity of heating across the width of said rounded corners.

6. The improved impulse heat generation and sealer apparatus of claim 5 wherein said groove filler material has a negative bank in thickness at said rounded corners to be greater in thickness at the inside radius of said rounded corners and lesser in thickness at the outside radius of said rounded corners, whereby greater uniformity of heating across the width of said rounded corners is attained.

7. The improved impulse heat generation and sealer apparatus of claim 1 wherein said heat sink block is made of a metal.

8. The improved impulse heat generation and sealer apparatus of claim 7 wherein said metal is aluminum.

9. The improved impulse heat generation and sealer apparatus of claim 1 wherein said shallow groove is formed by machining.

10. The improved impulse heat generation and sealer apparatus of claim 1 wherein said shallow groove is formed by photoetching.

11. The improved impulse heat generation and sealer apparatus of claim 1 wherein said shallow groove is generally rectangular in transverse cross-section and has a substantially greater width than depth.

12. The improved impulse heat generation and sealer apparatus of claim 11 wherein said shallow groove has a bottom and two sides extending therefrom at respective groove bottom corners, said groove bottom corners being of a smooth curve in transverse cross-section.

13. The improved impulse heat generation and sealer apparatus of claim 1 wherein said groove lining material comprises anodized aluminum.

14. The improved impulse heat generation and sealer apparatus of claim 1 wherein said groove lining material comprises synthetic sapphire.

15. The improved impulse heat generation and sealer apparatus of claim 1 wherein said groove lining material comprises alumina.

16. The improved impulse heat generation and sealer apparatus of claim 1 wherein said groove lining material has a K value in the range of approximately 60 to approximately 90 units.

17. The improved impulse heat generation and sealer apparatus of claim 1 wherein said groove filler material comprises a porous nickel-chromium alloy.

18. The improved impulse heat generation and sealer apparatus of claim 1 wherein said release coating comprises TEFLON.

19. The improved impulse heat generation and sealer apparatus of claim 1 wherein said release coating has a K value of approximately greater than 1000 units.

20. The improved impulse heat generation and sealer apparatus of claim 1 wherein said release coating is a fused powder coating.

21. The improved impulse heat generation and sealer apparatus of claim 1 wherein said mating surfaces are substantially planar.

22. The improved impulse heat generation and sealer apparatus of claim 1 wherein each of said groove lining and groove filler materials is selected from the group consisting of plasma sprayed, metallic vapor deposited, painted, dipped, and electroplated coatings.

23. The improved impulse heat generation and sealer apparatus of claim 1 further comprising at least one insulating slot disposed in said heat sink block adjacent said filled shallow groove for insulating said filled shallow groove from the remainder of said block for reducing heat loss therefrom during heating and sealing.

24. The improved impulse heat generation and sealer apparatus of claim 23 wherein at least one said insulating slot is disposed on each lateral side of said filled shallow groove.

25. The improved impulse heat generation and sealer apparatus of claim 23 wherein said insulating slot extends into said block to a depth below that of said filled shallow groove.

26. The improved impulse heat generation and sealer apparatus of claim 1 further comprising a cycling chamber disposed in said block with at least a substantial portion of said cycling chamber disposed beneath said filled shallow groove for alternating receipt therein of a coolant and a purging fluid to quickly cool the filled shallow groove after heating and sealing and to purge the coolant in preparation for the next heating and sealing; and pumping means for alternatingly supplying the coolant and the purging fluid to said cycling chamber, whereby rapid heat cycling of the improved impulse heat generation and sealer apparatus is attained.

27. The improved impulse heat generation and sealer apparatus of claim 26 wherein the coolant is water.

28. The improved impulse heat generation and sealer apparatus of claim 26 wherein the purging fluid is air.

29. The improved impulse heat generation and sealer apparatus of claim 26 further comprising:
a manifold disposed adjacent said block;
coolant inflow conduit means and coolant outflow conduit means connected to and supplying said connecting cycling chamber; and
purging fluid inflow conduit means and outflow conduit means connecting said cycling chamber and said manifold,
whereby the coolant and purging fluid may be alternatingly supplied to said cycling chamber and removed therefrom.

30. The improved impulse heat generation and sealer apparatus of claim 29 wherein said coolant inflow conduit means and said purging fluid inflow conduit means comprise common conduit means into said cycling chamber.

31. The improved impulse heat generation and sealer apparatus of claim 29 wherein said purging fluid outflow conduit means and said coolant outflow conduit means comprise common conduit means from said cycling chamber and into said manifold.

32. The improved impulse heat generation and sealer apparatus of claim 29 wherein said manifold is insulated from said heat sink block.

* * * * *